United States Patent

Schoolcraft

[15] 3,667,046

[45] May 30, 1972

[54] VOICE TRANSMISSION AND RECEIVING SYSTEM EMPLOYING PULSE DURATION MODULATIONS WITH A SUPPRESSED CLOCK

[72] Inventor: Ralph W. Schoolcraft, Torrance, Calif.

[73] Assignee: The Magnavox Company, Torrance, Calif.

[22] Filed: Oct. 9, 1969

[21] Appl. No.: 865,145

[52] U.S. Cl. ....................................325/38, 178/67, 325/30, 325/142, 325/163, 325/320, 307/265, 329/106, 332/9, 340/206

[51] Int. Cl. .........................................................H04b 1/00

[58] Field of Search.............179/15 AB, 15 MM; 178/67, 68; 325/30, 38, 142, 152, 163, 320, 321, 322, 324, 58, 47, 164; 328/58; 329/106; 332/9, 14, 15; 307/265; 340/347 DD, 347 AD, 206

[56] References Cited

UNITED STATES PATENTS

| | | | |
|---|---|---|---|
| 3,460,068 | 8/1969 | Lechleider | 325/142 |
| 3,478,170 | 11/1969 | Hanni | 325/142 |
| 3,500,387 | 3/1970 | Craven et al. | 340/347 AD |

*Primary Examiner*—Robert L. Griffin
*Assistant Examiner*—Albert J. Mayer
*Attorney*—Smyth, Roston & Pavitt

[57] ABSTRACT

A voice transmission system including coded voice information using pulse duration modulation (PDM) with a suppressed clock and wherein this suppressed clock pulse duration modulated voice signal is used to modulate a phase shift keying modulator (PSK). The receiver includes a phase shift keying demodulator which feeds a limiter having a wide bandwidth so as to achieve the highest possible processing gain. The receiver also includes a voltage controlled oscillator which is fed an error signal derived from an integrator so as to produce an output signal from the voltage controlled oscillator to replace the suppressed clock.

16 Claims, 16 Drawing Figures

INVENTOR:
Ralph W. Schoolcraft

By Smyth, Roston & Pavitt
ATTORNEYS

INVENTOR:
Ralph W. Schoolcraft
By Smyth, Roston & Pavitt
ATTORNEYS

VOICE TRANSMISSION AND RECEIVING SYSTEM EMPLOYING PULSE DURATION MODULATIONS WITH A SUPPRESSED CLOCK

The present invention is directed to a voice transmission system using pulse duration modulation (PDM) as the method of coding the voice information. The present invention has application in all types of voice communication and especially for use in airline communications, but it is to be appreciated that the invention may be used for other types of communications other than airline communication.

As the need for extended airline communications increases, transmission systems other than those presently in use become necessary. For example, in ordinary line-of-sight communication, the current communication systems are generally AM, single sideband or FM. Generally the single sideband and FM provide very reliable transmission characteristics for line-of-sight communication. When the communications are beyond line of sight, the problems encountered by communication systems now in use are greatly increased. For example, communication systems which depend upon ionospheric reflection are unreliable since these systems are subject to sun spot activity and to variations in atmospheric conditions. Also, the extended range AM communication systems are undesirable because they require excess power.

It has been proposed, therefore, that communications beyond line or sight should use a satellite type of communications system and, in addition, should use FM or other types of constant envelope modulation as the coding of the information. The use of satellite communication is highly reliable and provides a very extended range and eliminates the dependence on natural phenomena.

The present invention is directed to a transmission system using a form of modulation which is highly efficient, easy to implement and compact in structure and specifically includes the use of pulse duration modulation (PDM) as the method of modulating the voice information.

Basically, the system involves the use of sampling techniques to permit the transformation of the analog voice signals into coded information. The analog voice signals are inherently two dimensional variables since they include both amplitude and time (frequency). The analog voice signals are converted into signals having one fixed dimension, which is the sampling rate, and one variable dimension containing the amplitude information. The minimum sampling rate that permits a reconstruction of the analog signal, which sampling rate is called the Nyquist rate, is twice the highest frequency component of the analog signal.

There are basically two modulation techniques that are associated with sampled information. One technique varies the pulse amplitude to represent the sampled analog amplitude and the other technique varies the pulse timing to represent the amplitude of the analog signal. The first technique is called pulse amplitude modulation (PAM) and is rudimentary in form. The receiver is essentially a low pass filter. Since the pulse amplitudes must be preserved in the RF receivers, this system is essentially identical in characteristics to AM.

The second technique associated with sampled information is called pulse time modulation (PTM). One type of PTM is pulse position modulation (PPM) which represents the analog amplitude by the position of a narrow pulse within the sample period. PPM generally finds application in pulsed transmitters. Since the amplitude of the narrow pulses is constant, PPM when used with pulse transmitters has a processing gain equivalent to FM and, in a similar fashion to FM, the bandwidth can be traded for transmitter power.

A second type of PTM is called pulse duration modulation (PDM) or pulse width modulation (PWM). In PDM the pulsewidth represents the analog amplitude. PDM does not have any significant advantages over PPM in pulsed transmitters, but PDM is suited to constant power transmission techniques such as phase shift keying (PSK) transmission.

The present invention specifically takes an analog signal and samples that analog signal to convert the analog signal to a pulse amplitude modulation (PAM) signal. The PAM signal is then converted to a PDM signal and, as a further advantage over existing voice communication systems, the clock which is inherent to a normal PDM signal is suppressed so as to produce a suppressed clock PDM signal. The informational signal is transmitted by modulating a phase shift keying (PSK) modulator with the suppressed clock PDM signal and transmitting this PSK modulated information. The above steps of coding the analog signal provide very high efficiency in the transmission of voice information relative to the necessary bandwidth power which allows information to be received where there is a relatively poor signal-to-noise ratio. Nearly optimum demodulation avoids signal-to-noise thresholds such as are associated with FM communication systems. The present invention, therefore, allows for the transmission and reception of voice information which is reliable and which can be understood even though the distances between transmission and reception are quite great and even though the linkage between transmission and reception would generally be considered noisy.

In the reception of the information, the present invention first provides for a demodulation of the information using a PSK demodulator. The output from the PSK demodulator is then applied to a limiter and the limiter instead of having a narrow bandwidth has a relatively wide bandwidth. The bandwidth of the limiter is widened so that the noise information actually starts to have significant cross-overs other than when the actual data makes normal transitions. Although it would be thought that widening the bandwidth would actually increase the noise, the present invention provides for widening the bandwidth to an optimum point so as to actually lower the noise. Specifically, the optimum point for the bandwidth is approximately at the point where the noise due to the jitter in the signal is approximately the same as the noise due to unwanted cross-overs.

The suppressed clock PDM signal is then applied as one input to an exclusive OR gate. A second input to the exclusive OR gate is a clock signal which has been divided in half by a flip-flop. The output signal from the exclusive OR gate is the PDM signal including the clock.

The clock signal is produced by controlling a voltage controlled oscillator in accordance with the integral of the output from the exclusive OR gate. The average value of voice reference to has a zero d-c level and, therefore, the integral of the output signal from the exclusive OR gate should normally be zero (or a minimal value). When the phase of the output signal from the exclusive OR gate is incorrect, the integral is no longer the nominal value and may be used as an error signal to control the voltage controlled oscillator.

The audio signal is then reconstructed from the PDM signal to complete the operation of the receiver. A clearer understanding of the invention will be had with voice to the following description and drawings wherein.

Figure 1:
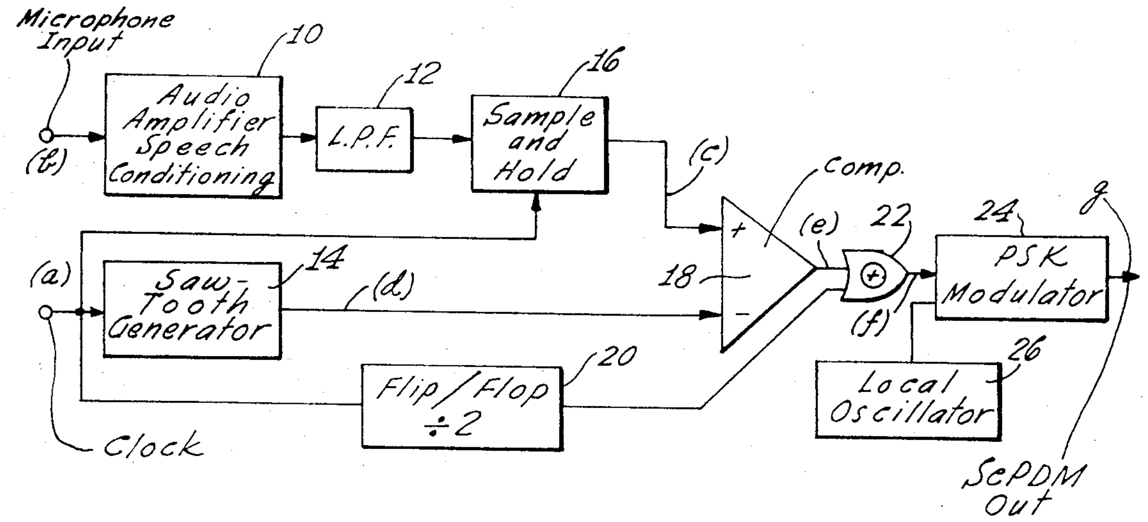
FIG. 1 illustrates a block diagram of a transmitter constructed in accordance with the teachings of the present invention.

In FIG. 1, a block diagram of a transmitter is shown which converts an autio input signal to a suppressed clock, pulse duration modulated, phase shift keying modulated output signal. The operation of the transmitter of FIG. 1 may be more clearly understood with reference to the waveforms shown in FIGS. 3 (*a*) through 3 (*g*). The waveforms shown in FIGS. 3 (*a*) through 3 (*g*) represent the signals at the corresponding positions noted in FIG. 1 by the small letters of the alphabet.

In FIG. 1 the microphone input, which is the audio signal, is applied to an audio amplifier and speech conditioning circuits. The audio input signal as applied to the audio amplifier 10 may have the characteristics as shown by the waveform in FIG. 3 (*b*). The speech conditioning, for example, may include pre-emphasis, dynamic compression or clipping and automatic gain control (AGC). The speech conditioning improves the intelligibility of the voice under low audio signal-to-noise conditions.

The AGC insures a high index of modulation and the dynamic compression is used to increase the effective modulation. The pre-emphasis may provide for a 6 db per octave pre-emphasis and wherein the receiver provides for a 6 db per octave de-emphasis. Normally, the male voice peaks at approximately 300 cycles per second and actually rolls off a little bit faster than the chosen pre-emphasis of 6 db per octave above 300 cycles per second. The pre-emphasis converts the voice to a nearly flat spectrum. The transmitter, therefore, can be fully modulated at all frequencies within its passband.

In the receiver the de-emphasis restores the triangular spectrum of the voice and also rolls the noise into a triangular spectrum. Therefore, the signal-to-noise ratio is approximately constant throughout the output audio spectrum. Without this pre-emphasis, the audio highs which bear a good portion of the intelligence information fade progressively below the flat noise spectrum.

The other speech conditioning technique which aids the intelligibility is the compression, or clipping. The transmitter in FIG. 1 has two intrinsic clippers. One of them is the actual pulse duration modulator and the other clipper is in the speech conditioner and follows the pre-emphasis portion of the speech conditioner. As indicated above, the compression or clipping increases the effective modulation.

The output from the audio amplifier 10 is applied to a low pass filter 12. The low pass filter eliminates all audio information above F/2 where F is the sampling clock rate. The clock is applied to the sawtooth generator or ramp generator 14 and the clock signal has the characteristics as shown in FIG. 3 (*a*).

The output from the low pass filter 12 is applied to the sample and hold circuit 16. The sample and hold circuit takes very short samples, for example, one microsecond, and holds this sample information for the sample period, which would be 1/F where F is the frequency of the clock signal. The output of the sample and hold circuit 16 is shown in FIG. 3(*c*) and can be seen to be a stepped wave approximating the audio information shown in FIG. 3 (*b*). The effect of the speech conditioning and low pass filter are not shown in these figures since it is simpler to understand than the operation of the system by ignoring these effects as they would affect the waveforms. However, the speech conditioning would be used as indicated above. The output of the sample and hold circuit 16 may actually be considered to be a pulse amplitude modulated (PAM) signal since the pulse periods are constant but the amplitude of the pulse is variable.

Figure 3:
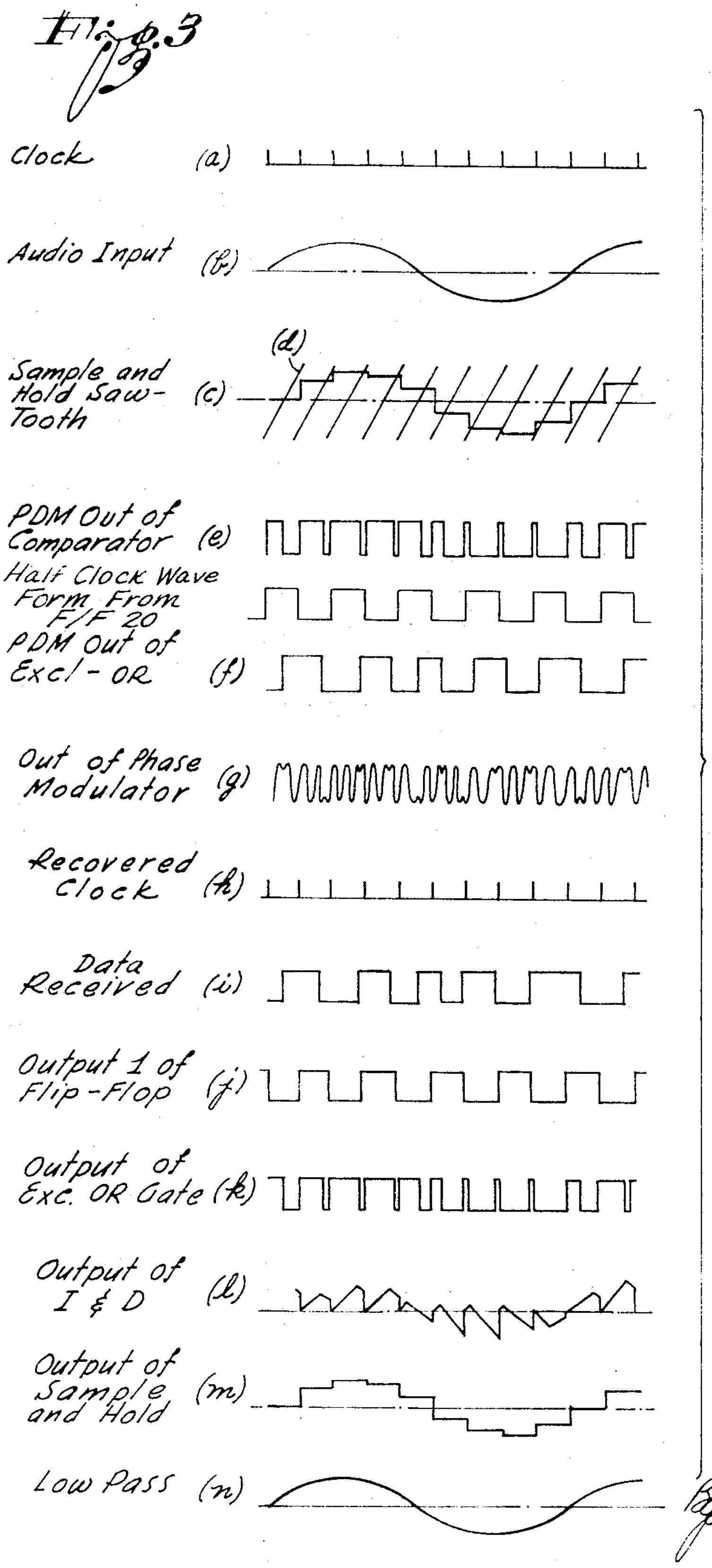
FIGS. 3 (*a*) through 3 (*n*) are waveforms which are used to explain the operation of the system of FIGS. 1 and 2.

The output of the sawtooth generator 14 is shown in FIG. 3 (*d*) which is superimposed on FIG. 3 (*c*). As can be seen in FIG. 3 (*d*), this sawtooth or ramp generator produces an output signal which rises to a given value. The output from the sample and hold circuit 16 and the output from the sawtooth generator 14 are applied to a comparator 18. The output of the comparator 18 is shown in FIG. 3(*e*). Each time the signal from the sample and hold circuit 16, shown in FIG. 3(*c*), changes in value, the output signal produced by the comparator 18 rises. When the signal value from the ramp generator 14 rises to the same value as that from the sample and hold circuit 16, this coincidence produces a drop in the output signal from the comparator 18. Therefore, the output signal from the comparator 18 is a pulse signal which has a trailing edge which occurs only upon coincidence of the signal from the ramp generator 14 and the sample and hold circuit 16. Therefore, the pulse width of the output signal from the comparator 18 is in accordance with the amplitude of the signal from the sample and hold circuit 16 and the output signal from the comparator 18 is therefore a pulse duration modulated signal including clock transitions formed by the leading edge of each pulse.

The clock signal shown in FIG. 3 (*a*) is also applied to a flip-flop 20 which has the effect of dividing the clock signal in half. The output from the flip-flop 20 is applied as one input to an exclusive OR circuit 22. Also applied as the other input to the exclusive OR circuit is the output from the comparator 18. The exclusive OR circuit 22 provides for a modulo-2 addition of the PDM signal from the comparator 18 and the F/2 signal from the flip-flop 20 so as to remove the clock transitions in the PDM signal from the comparator 18. The output from the exclusive OR circuit 22, therefore, is a suppressed clock PDM signal and has a waveform as shown in FIG. 3 (*f*). An exclusive OR circuit such as the circuit 22 is well known. It provides an output signal when an input signal is introduced to one or the other of two input terminals of the OR circuit but not when input signals are simultaneously introduced to both input terminals of the OR circuit.

As can be seen in FIG. 3(*f*), the suppressed clock PDM signal only changes upon appearance of the trailing edge of the pulse signal shown in FIG. 3 (*e*). This has the effect of maximizing the information which can be sent within a particular bandwidth transmission signal, which in turn increases the efficiency of the transmission system. By suppressing the clock signals, the number of signals transmitted to represent the voice information is minimized. On this basis, the samplings of signal amplitude of the voice information can be increased without increasing the bandwidth so that the quality of the voice information reproduced at the receiver is enhanced.

As a final step, the suppressed clock PDM signal is used to modulate a phase shift keying modulator 24. The phase shift keying modulator 24 may be also driven by a local oscillator 26. The output signal from the phase shift keying modulator 24 is shown in FIG. 3 (*g*) and, as can be seen in FIG. 3 (*g*), the high frequency signal supplied by the local oscillator 26 has its phase shifted upon each transition of the suppressed clock PDM signal from the exclusive OR circuit 22. The use of the suppressed clock PDM signal to modulate the PSK modulator represents an extremely efficient use of bandwidth of the output signal and provides for a very efficient and practical transmission system.

Figure 2:
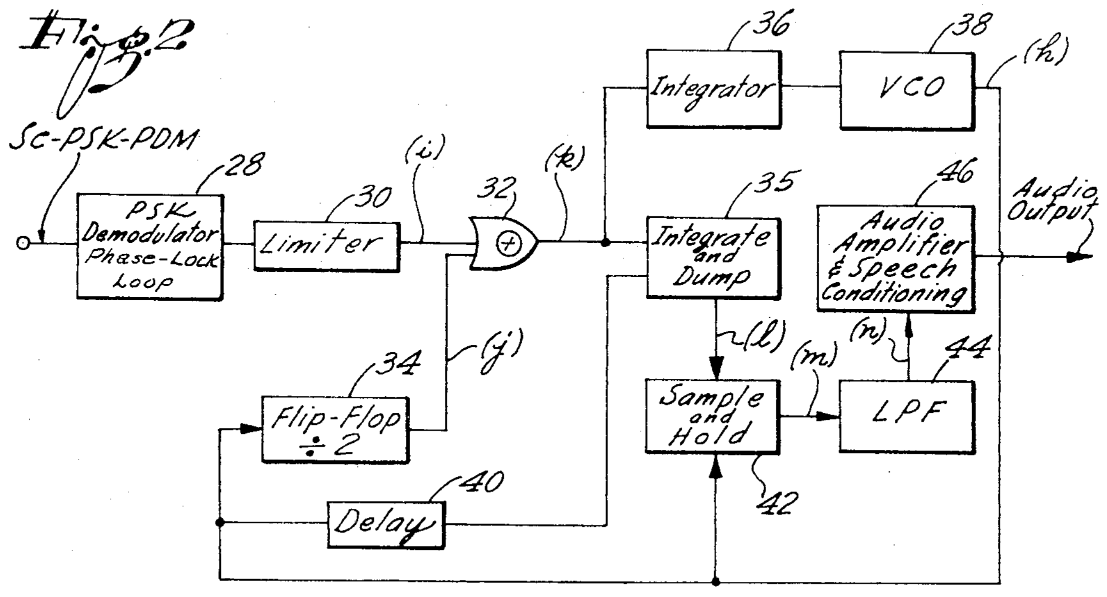
FIG. 2 illustrates a receiver constructed in accordance with the teachings of the present invention.

The output signal from the transmitter of FIG. 1 may be received by the receiver of FIG. 2. In FIG. 2, the PSK modulated suppressed clock PDM signal as shown in FIG. 3 (*g*) is applied to a PSK demodulator 28. This demodulator may be a phase-lock loop which is used to demodulate the PSK signal by generating a coherent carrier reference and then product demodulating the PSK input signal. The output from the PSK demodulator is applied to a limiter 30.

The output from the limiter 30 is the signal shown in FIG. 3 (*i*) which is the suppressed clock PDM signal and is essentially identical to the signal shown in FIG. 3 (*f*). Prior to the introduction to the limiter 30, the signal from the PSK demodulator may contain a considerable amount of noise. This noise takes two forms which may be referred to as jitter noise and cross-over noise. The jitter noise causes an apparent time variation in the PDM signal cross-over and the cross-over noise is due to excursions of the signal plus noise which actually cross over the midpoint of the PDM signal swing and therefore appear to be sign changes in the PDM signal. The narrower the bandwidth preceding the limiter 30, the more cross-over noise is eliminated.

In the past, limiters have usually been designed to have relatively narrow input bandwidth so as to eliminate cross-over noise since the cross-over noise may result in false data due to non-optimum demodulation techniques. However, the present invention includes a relatively wide band limiter in place of the prior art narrow band limiters. The bandwidth is opened up until the limiter begins to threshold, which is when the signal starts to have significant cross-overs other than when the data is making a transition. Opening up the bandwidth provides for an improvement of the output signal from the limiter since jitter noise decreases as the bandwidth is increased. Therefore, it is desirable to choose a bandwidth for the limiter in the vicinity where the jitter noise and the cross-over noise have approximately the same value since this should provide for the minimum total noise in the system.

The output from the limiter 30 is then applied as one input to an exclusive OR circuit 32. The second input to the exclusive OR circuit 32 is from a flip-flop 34. The input to the flip-flop 34 is a reconstructed or recovered clock signal as shown in FIG. 3(*h*). The flip-flop 34 produces a signal as shown in FIG. 3(*j*) which has one-half of the frequency of the clock signal shown in FIG. 3(*h*). The output from the exclusive OR circuit 32 has the characteristic shown in FIG. 3(*k*) and is essentially the PDM signal shown in FIG. 3(*e*). FIG. 3(*k*) and FIG. 3(*e*) should, therefore, be the same signal.

The output from the exclusive OR circuit 32 is applied to an integrate and dump circuit 35 and an integrator 36. The output from the integrator 36 is applied to control the frequency of a voltage controlled oscillator 38 and the combination of the integrator 36 and the voltage controlled oscillator 38 provide for clock acquisition. The output of the integrator 36 would have a d-c level of zero (or a nominal voltage representing zero phase error) if the phase of the output signal from the voltage controlled oscillator 38 is proper. This is because the average value of the voice information contained in the PDM signal from the exclusive OR circuit 22 would have a zero d-c level when the phase between the input signals to the exclusive OR circuit is proper so as to reinsert the clock at the proper position.

Since the output signal from the voltage controlled oscillator 38 is fed into the flip-flop 34, and the output from the flip-flop 34 is one of the inputs to the exclusive OR circuit 32, the integrator 36 detects errors in phase between the inputs to the exclusive OR circuit by producing a d-c error signal in accordance with this phase error. This error signal produced by the integrator 36 may be in one direction when the phase error is in a first direction and the error signal may be in an opposite direction when the phase error is in a second direction opposite to the first direction.

The output signal from the voltage controlled oscillator 38 operates as the recovered clock signal and the clock signal is applied to the flip-flop 34, to a delay circuit 40 and to a sample and hold circuit 42. The delay circuit 40 may have a very short delay such as one microsecond and used to control the dump portion of the integrate and dump circuit 35. The integrate and dump circuit 35 first integrates the PDM signal from the exclusive OR circuit 32 and then dumps this integrated signal upon command from the clock signal but only after the clock signal has been delayed by the delay circuit 40.

The output from the integrate and dump circuit 35 is supplied to the sample and hold circuit 42 and the sample and hold circuit samples the value of the signal produced in the integrate and dump circuit 35 immediately prior to the signal's being dumped. The output from the integrate and dump circuit 35 is shown in FIG. 3(*l*) and, as can be seen in FIG. 3(*l*), the output waveform of the integrate and dump circuit 35 has a final value proportional to the width of the pulses in the PDM signal from the exclusive OR circuit 32.

The output of the sample and hold circuit 42 is shown in FIG. 3(*m*) and, as can be seen in FIG. 3(*m*), the sample and hold circuit samples the final integrated value produced by the integrate and dump circuit 35 and holds that value for the clock period. The output waveform of the sample and hold circuit 42 as shown in FIG. 3(*m*) is essentially the same as the waveform shown in FIG. 3(*c*).

The output of the sample and hold circuit 42 is applied to a low pass filter 44 which removes unwanted harmonics and sideband information to reproduce the audio information originally applied as an input to the transmitter shown in FIG. 1. Therefore, the output of the low pass filter as shown in FIG. 3(*n*) is essentially the same as the original input information shown in FIG. 3(*b*). As a final step, the output of the low pass filter may be applied to an audio amplifier 46 which includes de-emphasis.

The present invention is, therefore, directed to a transmission system which provides transmission of a suppressed clock PDM signal which is used as the input signal to a PSK modulator. This type of coding system provides for an efficient modulation which may be passed through noisy transmission linkage with low loss of intelligibility. The use of the suppressed clock doubles the information that may be transmitted per bandwidth power and the PSK modulation provides for an efficient transmission of the suppressed clock PDM information. When the information is received, a limiter is used which has a relatively wide bandwidth so as to minimize the noise in the system. It is to be appreciated that various adaptations and modifications may be made and the invention is only to be limited by the appended claims.

I claim:

1. A system for coding analog information, including first means responsive to the analog information for producing a clocked pulse amplitude modulated (PAM) signal representative of the analog information, second means coupled to the first means and responsive to the clocked PAM signal for producing a clocked pulse duration modulated (PDM) signal representative of the clocked PAM signal, and third means coupled to the second means and responsive to the clocked PDM signal for suppressing the clock to produce a suppressed clock PDM signal representative of the clocked PDM signal.

2. The system of claim 1 further including fourth means coupled to the third means and responsive to the suppressed clock PDM signal for producing a phase shift keying (PSK) modulated signal representative of the suppressed clock PDM signal.

3. The system of claim 1 wherein the analog information undergoes speech conditioning including pre-emphasis and compression.

4. The system of decoding a suppressed clock, pulse duration modulated (PDM) signal representative of analog information, including first means responsive to the suppressed clock PDM signal for inserting a clock signal to produce a clocked PDM signal representative of the suppressed clock PDM signal, second means coupled to the first means and responsive to the clocked PDM signal for producing a clocked pulse amplitude modulated (PAM) signal representative of the clocked PDM signal, and third means coupled to the second means and responsive to the clocked PAM signal for producing an analog signal representative of the clocked PAM signal.

5. The system of claim 4 wherein the clock signal is produced by a voltage controlled oscillator (VCO) and wherein the VCO is controlled by an error signal and wherein the error signal is produced by integrating the output signal from the first means.

6. The system of claim 4 wherein the suppressed clock PDM signal is coupled through a wideband limiter and wherein the limiter has a bandwidth of a value wherein the jitter noise and the cross-over noise of the suppressed clock PDM signal are approximately equal.

7. A communications system for transmitting an output signal containing coded information representative of analog information, including first means responsive to the analog information for periodically sampling the analog information at a fixed rate and for providing a first pulse signal from the first means having amplitude values in accordance with the periodically sampled amplitude values of the analog information, second means coupled to the first means and responsive to the first pulse signal for producing a second pulse signal having pulsewidths in accordance with the amplitude value of the pulses in the first pulse signal and with the leading edges of the pulses in the second pulse signal occurring in response to the leading edges of the corresponding pulses in the first pulse signal and with the trailing edges of the pulses in the second pulse signal occurring in response to the amplitude of the corresponding pulses in the first pulse signal; and third means coupled to the second means and responsive to the second pulse signal for producing a third pulse signal having pulses with leading and trailing edges occurring in response to the trailing edges in the pulses in the second pulse signal.

8. The communications system of claim 7 additionally including fourth means coupled to the third means and responsive to the third pulse signal for producing an oscillator signal having its phase shifted upon the occurrence of the leading and trailing edges of the pulses in the third pulse signal.

9. The communications system of claim 7 including speech conditioning of the analog information and wherein the speech conditioning includes pre-emphasis and compression.

10. A communications system for receiving a suppressed clock pulse duration modulated (PDM) signal containing coded information representative of analog information, including first means for producing a clock signal having periodic changes in state, second means coupled to the first means and responsive to the suppressed clock PDM signal for producing a first pulse signal and with the leading edges of the pulses in the first pulse signal occurring in response to a change in state of the clock signal and with the trailing edge of the pulses in the first pulse signal occurring in response to a change in state of the suppressed clock PDM signal, third means coupled to the second means and responsive to the first pulse signal for producing a second pulse signal having pulse amplitudes in accordance with the pulsewidths of the first pulse signal, and fourth means coupled to the third means for producing an analog signal having amplitude values in accordance with the amplitudes of the pulses in the second pulse signal.

11. The communications system of claim 10 wherein the first means for producing the clock signal includes a voltage controlled oscillator controlled by an error signal produced by integrating the output signal from the second means.

12. The communications system of claim 10 wherein the suppressed clock PDM signal is coupled through a limiter and wherein the limiter has a bandwidth of a value wherein the jitter noise and the cross-over noise of the suppressed clock PDM signal are approximately equal.

13. A system for coding and decoding analog information, including first means responsive to the analog information for producing a clocked pulse amplitude modulated (PAM) signal representative of the analog information, second means coupled to the first means and responsive to the clocked PAM signal for producing a clocked pulse duration modulated (PDM) signal representative of the clocked PAM signal, third means coupled to the second means and responsive to the clocked PDM signal for suppressing the clock to produce a suppressed clock PDM signal representative of the clocked PDM signal and for transmitting such suppressed clock PDM signal, fourth means for receiving the suppressed clock PDM signal and for inserting a clock signal to produce a clocked PDM signal representative of the suppressed clock PDM signal, fifth means coupled to the fourth means and responsive to the clocked PDM signal for producing a clocked pulse amplitude modulated (PAM) signal representative of the clocked PDM signal, and sixth means coupled to the fifth means and responsive to the clocked PAM signal for producing an analog signal representative of the clocked PAM signal.

14. The system of claim 13 further including seventh means coupled to the third means and responsive to the suppressed clock PDM signal for producing a phase shift keying (PSK) modulated signal representative of the suppressed clock PDM signal, and eighth means coupled to the fourth means and responsive to the PSK modulated signal for producing a suppressed clock PDM signal representative of the PSK modulated signal and for coupling the suppressed clock PDM signal to the fourth means.

15. The system of claim 13 wherein the clock signal is produced by a voltage controlled oscillator (VCO) and wherein the VCO is controlled by an error signal and wherein the error signal is produced by integrating the output signal from the fourth means.

16. The system of claim 13 wherein the suppressed clock PDM signal is coupled through a wideband limiter and wherein the limiter has a bandwidth of a value wherein the jitter noise and the cross-over noise of the suppressed clock PDM signal are approximately equal.

* * * * *